United States Patent [19]

Fenart

[11] 4,155,604
[45] May 22, 1979

[54] MODULATING DEVICE FOR A HYDRAULIC CIRCUIT

[75] Inventor: Jean-Claude Fenart, Fourqueux, France

[73] Assignee: Societe Anonyme Francaise du Ferodo, Paris, France

[21] Appl. No.: 795,604

[22] Filed: May 10, 1977

[30] Foreign Application Priority Data

May 11, 1976 [FR] France .................. 76 14030

[51] Int. Cl.² ............................................. B60T 13/68
[52] U.S. Cl. ............................... 303/119; 303/22 R
[58] Field of Search ............... 137/596.17; 188/195; 303/3, 22 R, 113-119, 69, 6 C

[56] References Cited

U.S. PATENT DOCUMENTS

| | | | |
|---|---|---|---|
| 3,503,656 | 3/1970 | Shattock et al. | 303/22 R |
| 3,549,212 | 12/1970 | Leiber | 303/119 |
| 3,820,856 | 6/1974 | Adahan | 303/117 |
| 3,833,269 | 9/1974 | Trui et al. | 303/115 |

FOREIGN PATENT DOCUMENTS

| | | | |
|---|---|---|---|
| 2117733 | 7/1972 | France | 303/119 |
| 840439 | 7/1960 | United Kingdom | 137/596.17 |

*Primary Examiner*—Stephen G. Kunin
*Attorney, Agent, or Firm*—Charles E. Brown

[57] ABSTRACT

A modulating device for a hydraulic circuit as for a motor vehicle brake circuit, comprises two chambers of which one chamber is connected to a hydraulic actuator such as a brake pedal master cylinder and the second chamber is connected to a fluid receiver such as a wheel brake cylinder, with a first regulating valve controlling communication between the two chambers, and a second regulating valve controlling communication between the second chamber and a tank. The regulating valves are disposed parallel to and at a spacing from each other.

33 Claims, 20 Drawing Figures

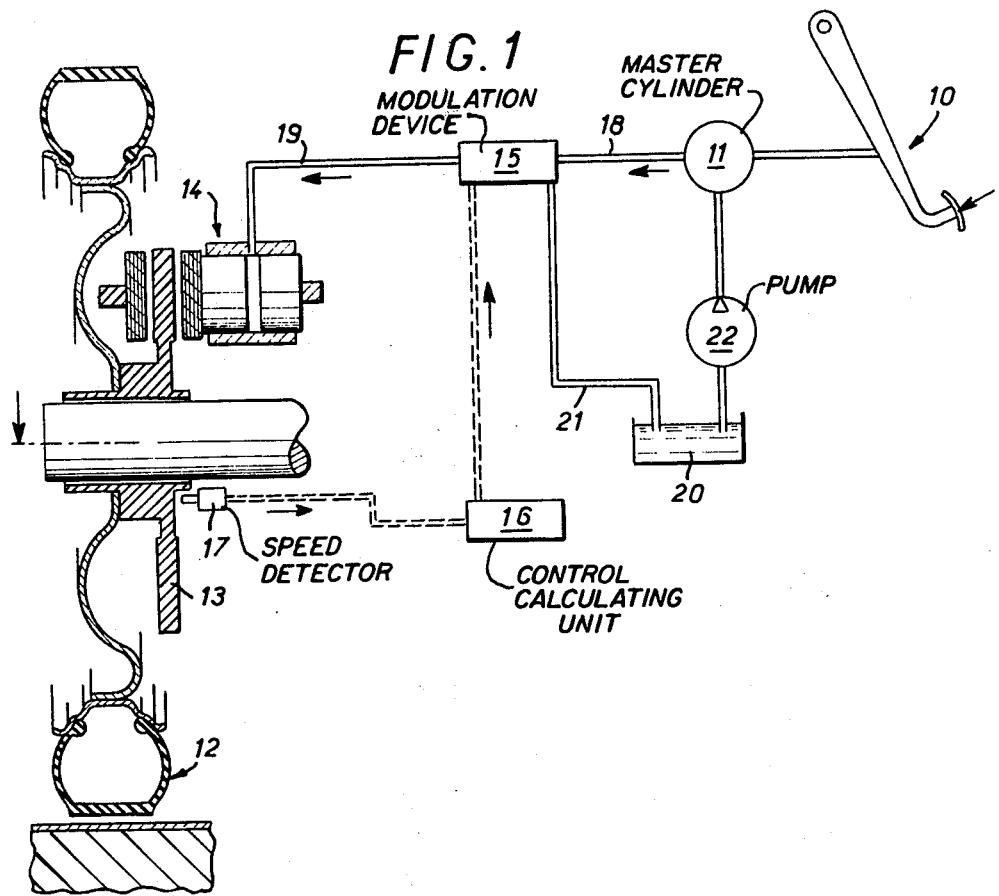
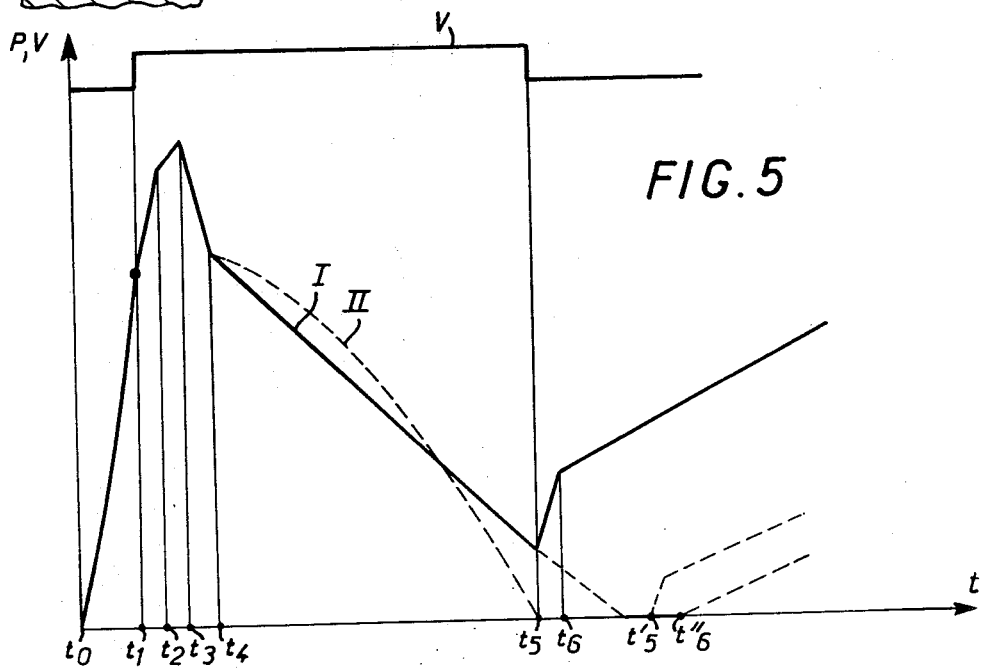

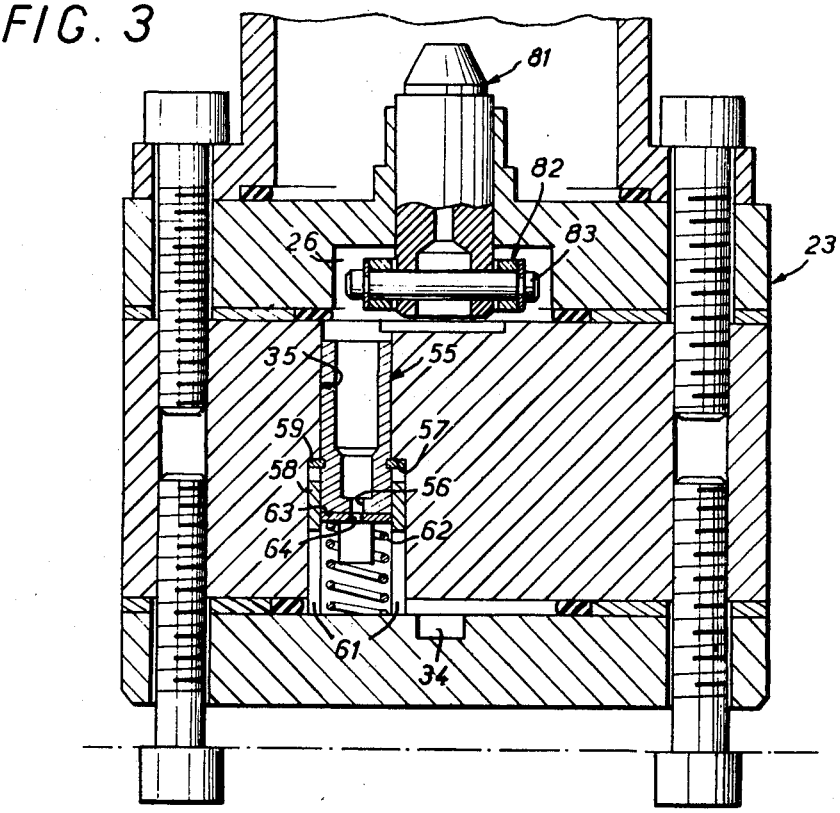
FIG. 3
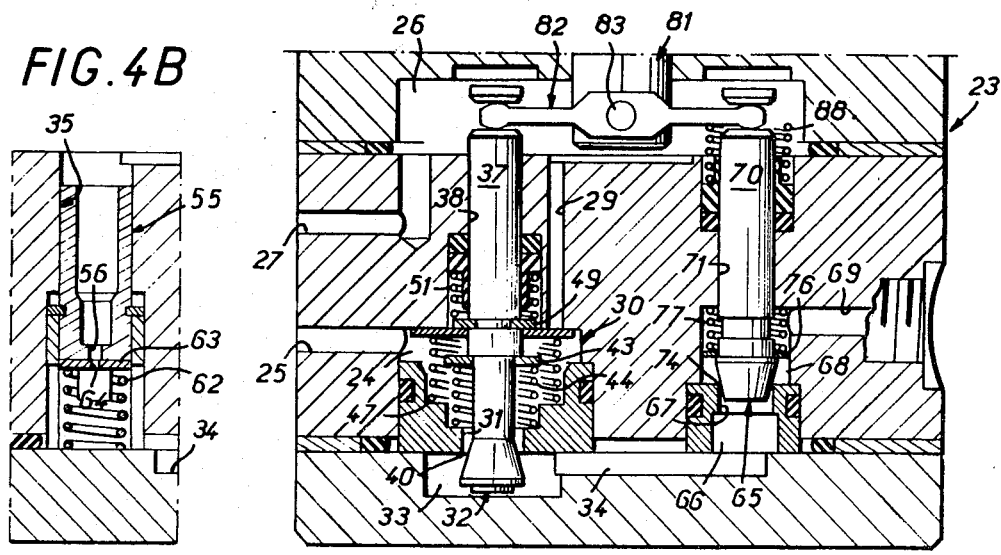
FIG. 4B
FIG. 4C

MODULATING DEVICE FOR A HYDRAULIC CIRCUIT

BACKGROUND OF THE INVENTION

It is known for a hyraulic circuit such as a motor vehicle brake actuating circuit to include a modulation device interposed between the hydraulic actuator such as a brake master cylinder and a hydraulic receiver such as a wheel brake cylinder. One form of such a device comprises a first chamber which in use is connected to the actuator and a second chamber connected to the receiver which the actuator is intended to control. Between the first and second chambers are a first communication passage controlled by a first valve which may be referred to as an isolating valve which is normally open, and a second communication passage controlled by a second valve which may be referred to as a rising pressure regulating valve and which is under a pilot control by electromagnetic actuating means. The device also has a passage providing communication between the second chamber and an outlet or tank; this communication passage is controlled by a third valve which may be referred to as a falling pressure regulating valve and which is also under a pilot control by electromagnetic actuating means. Each of the regulating valves is fixed to a respective guide stem which is slidably disposed in a guide bore formed for this purpose in the device body.

By way of the isolating valve which is normally open, there is normally a direct fluid flow connection between the first and second chambers and thus, in the case of a brake actuating circuit, between the brake master cylinder and the wheel cylinder.

When, as the result of the force applied by the vehicle driver to the brake pedal, the pressure in the second chamber, which is that connected to the braking receiver or wheel cylinder, increases dangerously to the point of reaching a critical value above which there would be a danger of locking the wheel or wheels being braked, the electromagnetic actuating means which provide the pilot control for the regulating valves, being subject to a control by control means responsive to the rotary speed of the wheel or wheels, then comes into operation. As a result, on the one hand the isolating valve and the rising pressure regulating valve close to interrupt the communication between the first chamber and the second chamber, while the falling pressure regulating valve opens to communicate the second chamber to the tank. The result of this is a fall in the pressure in the wheel cylinder which is thereafter isolated from its master cylinder.

In a first phase in the fall in pressure, the fall is abrupt, while in a second phase the fall continues in a controlled and moderate manner, under the control of the falling pressure regulating valve.

When the critical conditions which were likely to result in wheel locking have been removed, the electromagnetic actuating means ceases to operate and, under the action of resilient return means, the falling pressure regulating valve becomes operative again to close communication between the second chamber and the tank. This therefore permits a progressive rise in pressure in the second chamber and therefore in the wheel cylinder, under the control of the rising pressure regulating valve.

When the driver of the vehicle ceases to apply a braking pressure to the brake pedal, the isolating valve returns to its open position, unless it has already returned to that position previously.

Thus, when there are critical operating conditions which are close to those corresponding to wheel locking, such a modulation device causes a drop in the pressure in the wheel cylinder of the wheel or wheels which were in danger of locking, and this drop in pressure occurs irrespective of the braking pressure applied by the driver to the brake pedal; the modulation device then permits the pressure in the wheel cylinder to rise in a controlled manner when the critical conditions have been removed. The device is at all times capable of returning instantly to its rest or inoperative position in which it has no modulating action, as soon as the driver ceases to apply pressure to the brake pedal or as soon as the conditions of grip between the wheel and the road surface have been restored to a satisfactory value.

Previously known modulation devices of this type suffer from some disadvantages, essentially because the falling pressure regulating valve is in most cases formed by a simple needle member which controls a passage directly connected to a tank discharge. The needle member forming the falling pressure regulating valve is disposed generally in axial alignment with the rising pressure regulating valve and a single actuating means is provided between the needle valve and the rising pressure regulating valve and acts successively and alternatively on one or other of the valves, according to the conditions on which operation thereof depends.

Besides the fact that such a needle member is in practice delicate in construction, it is subjected on its two faces to different pressure. Accordingly, in order for the electromagnetic actuating means, which provide the pilot control action for the needle valve, to be capable of suitably ensuring opening of the needle valve, it is necessary that such actuating means should be relatively powerful and therefore cumbersome and expensive.

In addition, the fact that a single actuating means is used between the two regulating valves for actuation thereof inevitably gives rise to a time delay between the moment at which the actuating means ceases to act on the falling pressure regulating valve, at the end of the presssure fall phase, and the moment at which the actuating means acts on the rising pressure regulating valve at the beginning of the pressure rise phase which follows the pressure fall phase.

Although this time delay is minimal, generally some milliseconds only, the time delay can be sufficient in some cases to interfere with satisfactory operation of the device. In addition, during the time delay, the wheel cylinder remains at a constant and minimum pressure.

Finally, in some previously known constructions, for the very purpose of its displacement from one valve to the other, the actuating means disposed between said valves requires that a pressure that is not zero should be maintained in the second chamber. Consequently, the pressure in the wheel cylinder to which the second chamber is connected can never be reduced to zero, whereas it would sometimes be desirable, in particular on a bad road surface, for example on frost or ice, that the pressure in the wheel cylinder should be reduced to zero.

SUMMARY OF THE INVENTION

An object of the invention is to provide a modulation device which does not suffer from the above disadvantages.

A further object of the invention is to provide a modulation device which provides an increased degree of sensitivity in its modulating action.

Yet a further object of the invention is to provide a modulating device which suffers substantially no time delay between the respective phases of its modulating operation.

A still further object of the invention is to provide a modulating device which if required can permit the pressure in the braking receiver, for example a wheel brake control hydraulic cylinder, to be reduced to zero for preventing locking of the wheel on very slippery surfaces such as frost or ice.

Yet another object of the invention is to provide a modulation device which makes it possible to modulate, over a wide range, relative to each other, the corresponding pressure fall and pressure rise phases.

These and other objects are achieved by the present invention which provides a modulation device for a hydraulic circuit comprising a body providing a first chamber adapted to be connected to a hydraulic fluid actuator of the circuit, a second chamber adapted to be connected to a hydraulic fluid receiver of the circuit, first passage means between said first and second chambers and providing a first communication passage and a second communication passage therebetween, and second passage means providing a third communication passage, between said second chamber and a discharge. The device further has an isolating valve for controlling the first communication passage and which is normally open, a rising pressure regulating valve for controlling the second communication passage comprising a valve member and a guide rod member carrying the valve member and slidable in a first guide bore in the body for movement of the regulating valve between open and closed positions, a falling pressure regulating valve for controlling said third communication passage comprising a valve member and a guide rod member carrying the valve member and slidable in a second guide bore in the body for movement of the regulating valve between open and closed positions, said second bore being parallel and spaced from said first bore, and electromagnetic actuating means for providing pilot control of said regulating valves.

BRIEF DESCRIPTION OF THE DRAWINGS

FIG. 1 is a block diagram of a motor vehicle braking circuit with a modulation device according to the invention, FIG. 3 is another view in axial cross-section along line III—III in FIG. 2;

FIG. 4B is a similar view to FIG. 4A, showing a part of the device of FIG. 3 and illustrating a subsequent operating phase of the modulating device;

FIG. 4C is a view similar to FIG. 4A, showing a part of the device of FIG. 2 in another subsequent operating phase of the device;

FIG. 5 is a graph illustrating operation of the device;

DESCRIPTION OF THE PREFERRED EMBODIMENTS

Figure 2:
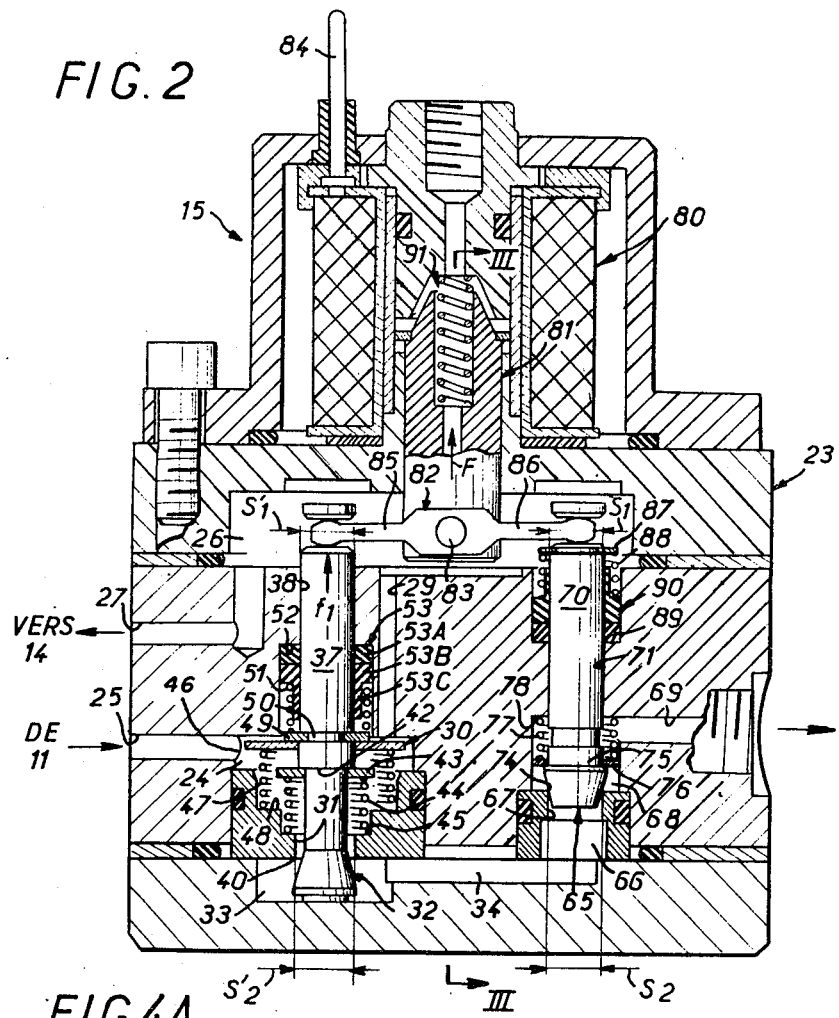
FIG. 2 is a view in axial cross-section of a first embodiment of the modulating device of the FIG. 1 circuit.

FIG. 1 shows use of the invention in a motor vehicle braking circuit.

FIG. 1 diagrammatically shows at 10 the brake pedal of the vehicle, at 11 a control member or master cylinder actuated by the pedal 10, at 12 one of the wheels of the vehicle, at 13 a brake member such as a disc which is fixed for rotation with the wheel, and at 14 a braking receiver or wheel cylinder associated with the brake disc 13.

In known manner, a modulation device 15 is interposed between the member 11 and the wheel cylinder 14, the device 15 being actuated by a control calculating unit 16 which is itself controlled by a speed detector 17 responsive to the angular rotary speed of the wheel 12.

The device 15 is connected to the member 11 by a line 18 and to the wheel cylinder 14 by a further line 19. The device 15 is connected to discharge or tank 20 by a line 21, and a pump 22 supplies hydraulic fluid to the member 11 from the tank 20.

The device 15 is shown in greater detail in FIGS. 2 and 3 from which it will be seen that the device comprises a hollow body 23 which is composed of various components which are suitably fitted together and which are part of the knowledge of the man in the art and which will therefore not be described in detail here.

Provided within the hollow body 23 is a first chamber 24 which by way of the line 18 and a passage 25 is connected to the member 11.

Associated with the first chamber 24 is a second chamber 26 which, by way of the line 19 and a passage 27 is connected to the cylinder 14.

The two chambers 24 and 26 are arranged to be interconnected for fluid flow, by a first communication passage comprising a passage 29 which is controlled by a valve 30 which is hereinafter referred to as an isolating valve and which will be described in greater detail below.

The two chambers 24 and 26 are further arranged to be interconnected for fluid flow by a second communication passage which successively comprises (FIG. 2) a passage 31 controlled by a valve 32 (hereinafter referred to as a rising pressure regulating valve), a volume 33 disposed at the side of the chamber 24 opposite to the chamber 26, a passage 34 and (FIG. 3) a bore 35.

The valve 32 comprises a valve member fixed to a guide rod or stem 37 as shown in FIG. 2 which is slidable in a guide bore 38. The bore 38 opens into the second chamber 26.

In the illustrated embodiment, the valve 32 is generally of a frustoconical configuration, its diameter increasing from its end adjacent to the stem 37, towards its free end. At its free end it engages into the volume 33 and its side surface co-operates with a valve seat formed at the edge of the opening 40 of the passage 31 in the volume 33.

In other words, the valve 32 is, generally, disposed axially beyond the valve seat 40 with which it co-operates, relative to the guide stem 37 which carries the valve.

At its end remote from the valve 32, the guide stem 37 is subject to the fluid pressure in the chamber 26. In the embodiment illustrated in FIGS. 2 and 3, the said end of the guide stem 37 projects into the chamber 26.

Within the chamber 24, the guide stem 37 has a radial shoulder 42 which serves as an abutment for an annular disc member or washer 43. Bearing against the washer 43 is one end of a spring 44 whose other end bears against a shoulder 45 of the hollow body 23, the spring 44 urging the valve 32 upwardly towards its closed position.

In the embodiment of FIGS. 2 and 3, the passage 29 which is controlled by the isolating valve 30 is parallel to the guide bore 38, and the isolating valve 30 comprises a simple annular disc member or washer which is arranged annularly about the guide stem 37 of the valve 32, in the chamber 24.

One end of a spring 47 bears on washer 46 and its other end bears against a shoulder 48 of the hollow body 23, to urge the isolating valve 30 towards a resilient split ring 49 which is engaged in a circumferential groove 50 in the guide stem 37 and which is therefore axially fixed thereto.

The split ring 49 acts moreover as an abutment for a spring 51 which holds a seal 53 in correct axial position, against a shoulder 52 of the hollow body 23. The seal 53 is disposed sealingly around the guide stem 37 of the valve 32.

As illustrated, in known per se manner, the seal 53 is formed by an axially compressible washer 53A and a sleeve 53B which is extended axially towards the valve 30 by a tapered sealing lip 53C which at its free end is gripped onto the guide stem 37.

Referring now to FIG. 3, in the bore 35 which forms part of the communication passage controlled by the valve 32, a piston 55 is mounted for axial movement between two abutments. The piston 55 is hollow and is generally closed at one end except for a calibrated orifice 56. One of the abutments between which the piston 55 is axially movable is formed by a shoulder 57 of the hollow body 23 while the other abutment is formed by the end face of a spacer sleeve 58 which is arranged in the bore 35, in a larger-diameter portion thereof. The piston 55 carries a radially extending collar 59, for example a resilient split ring, capable of co-operating with the said abutments.

For communicating the bore 35 with the passage 34, the sleeve 58 has longitudinally extending slots 61 over a part of its length.

In the bore 35 the piston 55 is subjected to the action of a spring 62 which urges it towards the chamber 26.

In the illustrated embodiment, the spring 62 presses against the end face of the piston 55 an annular disc member or washer 63 which has a calibrated orifice 64 aligned with the calibrated orifice 56 of the piston. The orifice 64 however is of a smaller flow section than the orifice 56.

Referring again to FIG. 2, the second chamber 26 is capable of being connected to tank 20 by a third communication passage controlled by a third valve 65, hereinafter referred to as a falling pressure regulating valve (see FIG. 2).

In FIGS. 2 and 3, the third communication passage successively comprises, starting from the chamber 26 in FIG. 3, the bore 35 and associated passage 34, and, as seen in FIG. 2, a volume 66 into which there opens a passage 67 controlled by the regulating valve 65, a volume 68 disposed at the side of the passage 67 opposite to the volume 66, and a passage 69 connected to the line 21.

The regulating valve 65 comprises a valve member fixed to a guide rod or stem 70 which is slidable in a guide bore 71 in the hollow body 23. The guide bore 71 is arranged parallel to the guide bore 38 of the associated regulating valve 32, at a spacing therefrom.

In the FIGS. 2 and 3 embodiment, the falling pressure regulating valve 65 is generally frustoconical, and its diameter decreases from the guide stem 70 to its free end.

The regulating valve 65 is thus generally disposed axially on the same side of the valve seat 74 with which it co-operates, as the guide stem 70. The valve seat 74 is formed by the edge of opening of the passage 67 into the corresponding volume 68.

The valves 32 and 65 are thus generally arranged head-to-toe relative to each other, that is to say, so as to be actuated for respective functions in opposite directions.

As in the case of the rising pressure regulating valve 32, the free end of the falling pressure regulating valve 68 is partly engaged in the volume 66.

In addition, and as in the case of the valve 32, at the end of the guide stem 70 remote from the valve 65, the guide stem 70 is subjected to the fluid pressure obtaining in the second chamber 26, said end projecting into the chamber 26 in the embodiment illustrated in FIGS. 2 and 3.

In the volume 68, the guide stem 70 has a shoulder 75 which provides an abutment for an annular disc member or washer 76 engaged by one end of a spring 77. The other end of the spring 77 bears against a shoulder 78 provided in the hollow body 23, to urge the valve 65 towards the valve seat 74.

The valves 32 and 65 have pilot control means in the form of electromagnetic actuating means.

In the embodiment of FIGS. 2 and 3, such electromagnetic actuating means are common to the two valves 32 and 65 and comprise a single energising coil 80 which is arranged for connection to the calculating unit 16 by means of a terminal 84. The axis of the coil 80 is so disposed that the axes of the guide bores 38 and 37 for the two valves 32 and 65 extend symmetrically relative to each other on respective sides of the coil axis.

The movable member actuated by the coil 80 is a movable armature 81 which is mounted for axial movement along the centre line of the coil 80 and which projects into the second chamber 26. A rocking actuating means is provided between the guide stems 37 and 38, connecting one such stem to the other. In FIG. 2, the rocking actuating means comprises a rocking arm 82 which is pivotally connected in its centre portion by means of a shaft 83 to the armature 81 and which has two arms 85 and 86 of equal length, on respective sides of the shaft 83. The lever 82 is pivotally connected to the guide stems 37 and 70 by respective ones of the arms 85 and 86. For example, as shown, the arms 85 and 86 have rounded end portions by means of which the arms are engaged in openings provided for this purpose in the corresponding guide stems 37 and 70.

In FIGS. 2 and 3, a resilient split ring 87 carried by the guide stem 70 provides an abutment for a spring 88 which holds a seal 90 in correct axial position against a shoulder 89 provided by the hollow body 23. The seal 90 is disposed sealingly around the guide stem 70, as clearly visible in FIG. 2.

The seal 90 is similar in its configuration to the seal 53 disposed around the guide stem 37.

In the FIGS. 2 and 3 embodiment, the movable armature 81 is engaged by a spring 91 which urges it towards the guide stems 37 and 70. The force of the spring 91 is such that, in the rest condition, that is to say, when the coil 80 is not supplied with power, and when the valve 65 is closed under the action of its spring 77 and thus acts as a fixed abutment for the rocking lever 82, the regulating valve 32 is in its open position in which it bears against the face of the volume 33 opposite to the associated valve seat 40, and the isolating valve 30 is also in its open position at a distance from the passage 29 which it controls, as shown in FIG. 2. Account must be taken, in this respect, of the demultiplication effect introduced by the rocking lever 82 into the action which is produced by the spring 91 on the regulating valve 32, in spite of the opposing forces which are produced conjointly with the spring 91, on the one hand by the spring 44 which urges the valve 32 directly towards its closed position and on the other hand by the spring 47 which urges the isolating valve 30 towards its closed position and also indirectly urges the regulating valve 32 towards its closed position; the action on the regulating valve 32 of the spring 51 provided for holding the seal 53 in position is considered as negligible in this respect, as the spring 51 can be of relatively low spring force. If for example the spring 47, which is stronger than the spring 44, has a spring force of 5 newtons whereas the spring 44 has a spring force of 2 newtons, the spring 51 having a negligible force of 1 newton, it is sufficient, taking account of the demultiplication effect of one half produced by the rocking lever 82, for the spring 91 to have for example a force of 20 newtons.

It will be understood that these numerical values are given here only by way of example, and they are not to be considered in any way as limiting of the invention.

Because the isolating valve 30 and the regulating valve 32 are both open, the same pressure obtains in the two chambers 24 and 26.

If at a moment $t_0$ in FIG. 5, a braking force is applied by the driver to the brake pedal 10, the equality between the pressures in the chambers 24 and 26 at first continues to prevail, as in normal circumstances, the isolating valve 30 being wide open, as also is the regulating valve 32, as described above. Thus, the effect of the force applied to the pedal 10 is at first fully transmitted to the wheel cylinder 14.

If however retardation of the wheel 12, resulting from the braking action by the cylinder 14, becomes excessively accentuated, to such an extent that the wheel 12 is on the point of locking, before the vehicle has come to a halt, at a moment $t_1$ the unit 16 causes the application of a given voltage V to the coil 80 in accordance with a functional process which is not part of the invention and which will not be described in detail herein. By virtue of the applied voltage V, the armature 81 is subjected to a selected magnetic force, in the direction indicated by arrow F in FIG. 2; the magnetic force is sufficient to overcome the opposing resilience which is applied in particular by the spring 91. For example, with the numerical values given hereinbefore by way of example, the magnetic force just mentioned will be of the order of 40 newtons.

The spring 77 which urges the valve 65 towards its closed position is selected to be of a sufficient stiffness so that the force which it applies to the regulating valve 65 is greater than the force which is applied in parallel therewith to the regulating valve 32 by the springs 44, 47 and 51, as described above.

Thereafter, when the movable armature 81 comes into operation and moves in direction F, the regulating valve 65 remains momentarily held in its closed position by its spring 77, whereby the free end of the arm 86 of the lever 82 remains stationary by bearing against the regulating valve 65; thus the rocking lever 82, under the action of the armature 81, urges the valve 32 towards its closed position as indicated by arrow f1 in FIG. 2.

The result of this, at moment $t_2$, is that the passage 29 is closed by the isolating valve 30 and then, at moment $t_3$, which is relatively close to moment $t_2$, the passage 31 is closed by the regulating valve 32.

Figure 4A:
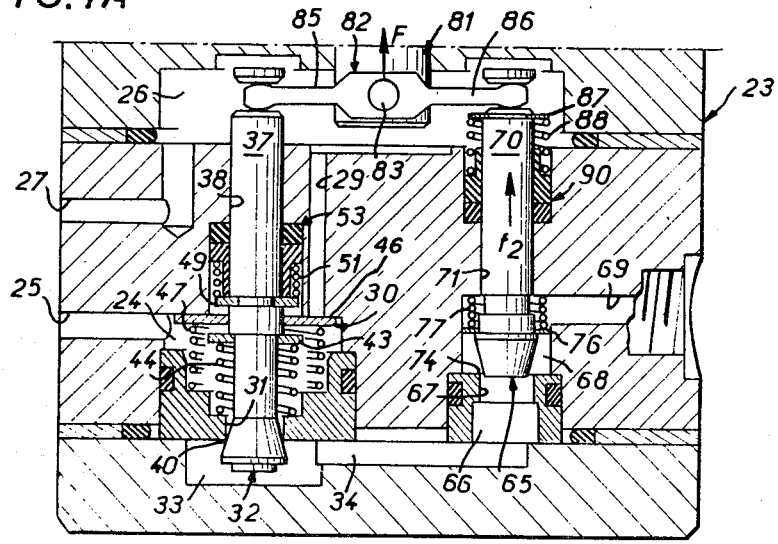
FIG. 4A is a view showing a part of the device of FIG. 2, in one operating phase of the device.

The action of the coil 80 and thus the armature 81 being continued, the lever 82 then bears on the regulating valve 32 which is still in its closed position whereby the valve 32 is then subjected by the lever 82 to a force which urges it towards the open position as indicated by arrow f2 in FIG. 4A. As will be understood, the corresponding rocking movement of the lever 82, between opening of the valve 65 and closure of the valve 32, is virtually instantaneous.

By closure of the valves 30 and 32, the chamber 26 is isolated from the chamber 24. In consequence, the pressure in the chamber 24 can increase under the effect of the force applied to the brake pedal 10, without the pressure in the chamber 26 being modified as a result. The wheel cylinder 14 is thus isolated from the pedal 10.

In contrast, because of the virtually simultaneous opening of the valve 65 which, by way of the communication passage controlled by that valve, communicates the chamber 26 with tank 20, the pressure in the chamber 26 begins to fall (FIG. 5). In a first period, this fall in pressure is rapid, as the piston 55 in the bore 35 associated with the corresponding communication first accompanies the flow of fluid which occurs in said communication between the chamber 26 and tank 20. Thus, the piston 55 moves against the associated spring 62 from its first abutment position in FIG. 3 to its second abutment position in FIG. 4B.

In a second period which begins at moment $t_4$ at which the piston 55 reaches its second abutment position, the fall in pressure in the chamber 26 is moderated and regulated. In fact, the flow of fluid from the chamber 26 to tank 20, which results in the fall in pressure in the chamber 26, must pass through the calibrated orifice 56 in the piston 55, and the washer 64 urged towards the piston 55 by the spring 62 is then driven towards the corresponding end of the bore by the fluid flow.

In practice, this fluid flow is equal to that which, in passing through the calibrated orifice 56 of the piston 55, is to develop a pressure drop which, conducted to the section S1 of the guide bore 71 of the valve 65, balances the combination of forces applied to the valve 65, namely, on the one hand, in the direction of closing the valve, the resilient force which is applied directly thereto by the spring 77 and, on the other hand, in the direction of valve opening, the magnetic force which is indirectly applied to the valve 65 by the armature 81 by way of the lever 82; the effect of the spring 88 is generally negligible.

If the valve 65 opens excessively, the flow rate from the chamber 26 to the tank 20 increases, and similarly the pressure drop at the calibrated orifice 56 of the piston 55 increases; the pressure difference which, resulting from this increase in pressure drop, is then established as between the chamber 26 and the volume 66, at the two ends of the assembly formed by the valve 65 and its guide stem 70, combines its effect with those already applied to the regulating valve 65 and accordingly urges the valve 65 towards its closed position.

If, under this force, the valve 65 closes excessively, the flow rate through the calibrated orifice 56 of the piston 55 tends to reduce, as also does the pressure drop at that orifice 56. In the reverse procedure to that just described above, there is then established between the chamber 26 and the volume 66 at the ends of the assembly formed by the valve 65 and the guide stem 70, a pressure difference which adds its force to the forces applied to the valve 65, thereby to urge the valve 65 towards its open position.

The result of this in practice is that the valve 65 is the subject of a floating movement about the operating position in which it permits a fluid flow which, as mentioned above, develops a pressure drop at the calibrated orifice 56 of the piston 55; the effect of such pressure drop is conducted to the section S1 of the bore 75 and balances the forces of resilient and magnetic origin which are already applied to the valve 65.

As will be appreciated, although the valve 65 controls the communication between the chamber 26 and the tank 20, the pressures which are applied to the ends of the assembly of which the valve 65 is a part are substantially equal, except for the pressure drop due to the calibrated orifice 56, so that the assembly is hydrodynamically balanced.

If the section S2 of the passage 67 controlled by the valve 65 is equal to the section S1 of the guide bore 71 of the valve 65, the curve representing evolution of the pressure P in the chamber 26 versus time t in the controlled pressure fall phase which began at the moment $t_4$ set forth above is a straight line I, as shown in solid lines in FIG. 5.

If, in an alternative form, the section S1 of the bore 71 is greater than the section S2 of the passage 67, the curve representing evolution of the pressure P in the course of the above-mentioned pressure fall phase is a curve II whose slope is at first smaller than that of the above-mentioned straight line but then progressively increases, being more accentuated as the pressure P falls, as shown in broken lines in FIG. 5, because the hydraulic force resulting from the difference between the above-mentioned sections S1 and S2 is then added to the forces applied to the valve 65.

For some uses, this arrangement may be particularly attractive as it produces modulation of the controlled fall in pressure, depending on whether the wheel being braked is on a relatively good or a relatively bad surface. In fact on a relatively good surface, the pressure in the chamber 26 always remains relatively high and the fall in pressure therefore is advantageously more moderate than it would be if the sections S1 and S2 were equal.

In contrast, on a poor surface, the pressure in the chamber 26 will always be relatively low and the fall in pressure is then advantageously more rapid than it would be if the sections S1 and S2 were equal.

Be that as it may, this controlled pressure fall phase continues to moment $t_5$ at which the unit 16 ceases to apply a voltage to the coil 80 (FIG. 5). From that moment, and under the force in particular of the spring 91, the movable armature 81 is displaced in the opposite direction that indicated by arrow F in FIG. 1.

The valve 32 being in the closed position as stated above, the lever 82 bears against the valve 32 and applies to the valve 65 a force which is in the opposite direction to that indicated by arrow F2 in FIG. 4A. As the valve 65 was already close to its closed position as stated above, complete effective closure of the passage 67 occurs almost instantly. As soon as the valve 65 is thus in its closed position (FIG. 4C), the lever 82 bears against the valve 65 and transmits only to the valve 32 the force applied by the spring 91 to the armature 81, so that the valve 32 also begins instantly to move towards its open position.

It will be seen therefore that closure of the passage 67 by the falling pressure regulation valve 65 and opening of the passage 31 by the rising pressure regulating valve 32 occur simultaneously.

In practice, in the inversion of the positions of the valve 65 and 32, the axial movement of the armature 81 which causes the inversion operation is virtually zero, except for the necessary clearances, and it is this feature which permits the inversion operation to be instantaneous.

From moment $t_5$ which indicates the beginning of the opening movement of the valve 32, there is again communication between the first chamber 24 and the second chamber 26, through the passage 31, volume 33, passage 34 and bore 35, although the isolating valve 30 remains in its closed position (see FIGS. 3 and 4C).

By virtue of such communication being established, and as long as pressure is applied to the brake pedal 10, the pressure in the chamber 26 rises and flow of fluid in the bore 35 is reversed.

In a first period, insofar as in the course of the preceding phase in which there was a controlled fall in pressure, the pressure P in the chamber 26 has not fallen to zero and has not been maintained for an excessively prolonged period at such a zero value, the rise in pressure in the chamber 26 is at first rapid, because of the piston 55 returning to its initial abutment position as shown in FIG. 3, under the action of the associated spring 62.

In a second period which begins at moment $t_6$ at which the piston 55 reaches its initial abutment position, the rise in pressure P in the chamber 26 continues, but in a moderate and regulated manner as can be seen from FIG. 5. The corresponding flow of fluid from the chamber 24 to the chamber 26 must then pass through the calibrated orifice 64 of the washer 63, and this calibrated orifice 64 is then acting as a substitute, in respect of the direction of fluid flow, for the calibrated orifice 56 of the piston 55.

In practice, the corresponding fluid flow between chambers 24 and 26 is that which, on passing through the calibrated orifice 64, produces a pressure drop whose effect on the valve 32, being conducted to section S'1 of the guide bore 38 thereof, balances the effect of the forces produced by the springs 44, 50 and 91; the spring 47 has no effect during this phase on the valve 32, as the isolating valve 30 is in its closed position and thus bears the thrust of this spring 47.

By virtue of a floating movement similar to that described in respect of the valve 65, the valve 32 thus provides for systematic control in the rise in pressure in the chamber 26.

If it is desired that such a controlled rise in pressure in the chamber 26 should always occur in an identical manner, irrespective of the pressure initially obtaining in the chamber 26, and it appears that for some uses at least it is desirable that this should be the case, the section S'2 of the passage 31 is equal to the section S'1 of the guide bore 38 so that, as shown in FIG. 5, the curve representing the evolution of the pressure P in the chamber 26 during this phase in which there is a controlled rise in pressure, is a straight line.

In practice, in the embodiment illustrated, the flow section of the calibrated orifice 64 which is operative in the course of this phase in which there is a controlled rise in pressure, is smaller than the flow section of the calibrated orifice 56 which is operative in the course of the above-described phase in which there is a controlled fall in pressure, so the slope of the straight line representing the controlled pressure rise phase is, as regards absolute value, less than that of the straight line which may possibly represent the controlled pressure fall phase.

The controlled pressure rise continues until the valve 30, entrained by the valve 32, returns to its open position.

Such a return to the open position of the isolating valve 30 occurs instantaneously if the pressing force being applied to the brake pedal 10 is released.

On the other hand, if during the controlled pressure rise phase, there is a re-establishment of the conditions which may tend to cause locking of the wheel 12, there is initiated a fresh pressure fall and then pressure rise, in a similar manner to the sequence described above.

If in the course of the controlled pressure fall phase, the pressure P in the chamber 26 falls to zero, there is no longer any fluid flow through the calibrated orifice 56 in the piston 55. As the piston 55 was at that time in its second abutment position, the piston 55 will then be subjected only to the force of the spring 62 so that it tends to return to its initial abutment position under the action of the spring 62, during the pressure fall phase. Accordingly, when the rapid pressure rise phase begins at corresponding moment $t'_5$ in FIG. 5, this phase is accordingly reduced in length. This phase can also be omitted if, at moment $t''_5$ corresponding to the end of the controlled pressure fall phase, the piston 55 has actually returned to its initial abutment position.

This arrangement is particularly advantageous because a zero pressure in the chamber 26 can occur only on poor surfaces, for example an ice-covered surface, and this is a situation in which it is desirable that the subsequent rise in pressure should not be excessively rapid.

In the foregoing description, and by virtue of the relative flow sections of the calibrated orifices 64 and 56, the rise in pressure is slower than the preceding fall in pressure, as described above. If desired, the rise in pressure can be as rapid as the fall in pressure, and for this purpose it is sufficient to remove the washer 63 with the calibrated orifice 64. In an alternative embodiment, the pressure rise can even be more rapid than the preceding pressure fall, and for this purpose it is sufficient to place the washer 63 inside the piston 56 and to provide a spring which bears against the washer to urge it against the inside end surface of the piston.

Figure 6:
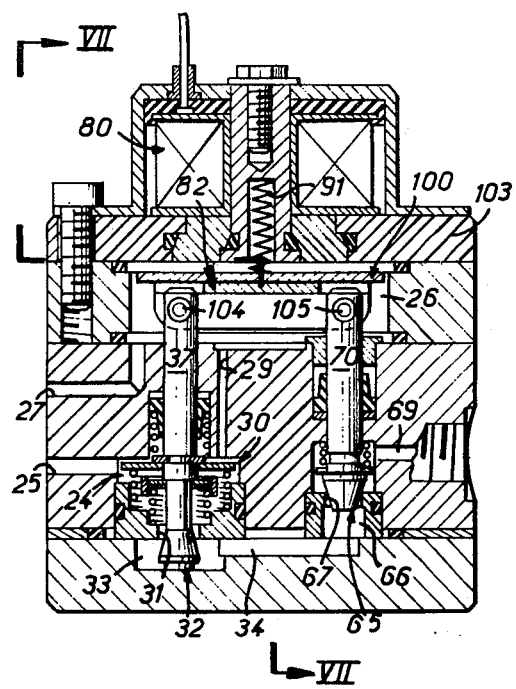
FIGS. 6 and 7 are views which are respectively similar to those of FIGS. 2 and 3 and showing a second embodiment.

In the foregoing description, the movable element which is controlled by the coil 80 is an axial armature 81. In an alternative form as shown in FIGS. 6 and 8, the movable element is a blade or vane 100 and the lever 82 pivotally connected to the guide stems 37 and 50 of the valves 32 and 65 is connected to the blade 100, or may be formed by that blade.

Figure 8:
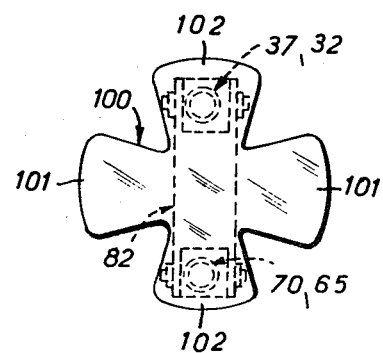
FIG. 8 is a plan view of a part of the second embodiment of FIGS. 6 and 7, as viewed in the direction VIII in FIG. 7.

Preferably, and as shown in FIG. 8, the blade 100 is of a cruciform configuration in order to minimise the effects of the air gap difference which will be produced, in line with the regulating valves 32 and 65, by rocking movement of the lever 82. During such a rocking movement, it will be appreciated that the two opposite arms 101 of the blade 100, which are generally perpendicular to the arms 102 of the blade, said arms 102 being placed above the rocking lever 82 (see FIG. 8), will remain at a substantially constant distance from the yoke 103 associated with the energisation coil 80, irrespective of the axial positions of the valves 32 and 65 to which the lever 82 is connected.

In an alternative form, the blade 100 or at least the part thereof which is of magnetic material, comprises only the above-mentioned arms 101.

The blade 100, of whatever form, is fixed to the lever 82 by any suitable means, for example by adhesive, welding or riveting. Alternatively, as mentioned above, the blade 100 can itself form the rocking lever 82.

As the other components of this embodiment are identical to those of the embodiment described with reference to FIGS. 2 and 3, operation thereof is similar to that described above. It will be noted however that the lever 82 is pivotally connected by spindles 104 and 105 to the guide rods or stems 37 and 70 of the valves 32 and 65.

In the foregoing description, the second communication passage between the first and second chambers 24 and 26, which is controlled by the valve 32, and the third communication passage between the second chamber 26 and tank 20, which is controlled by the valve 65, have a common portion, namely comprising the bore 35 in which the piston 55 is movably mounted, and passages 31 and 67 opening into volumes 33 and 36 forming a common chamber by virtue of the interconnecting passage 34.

Figure 9:
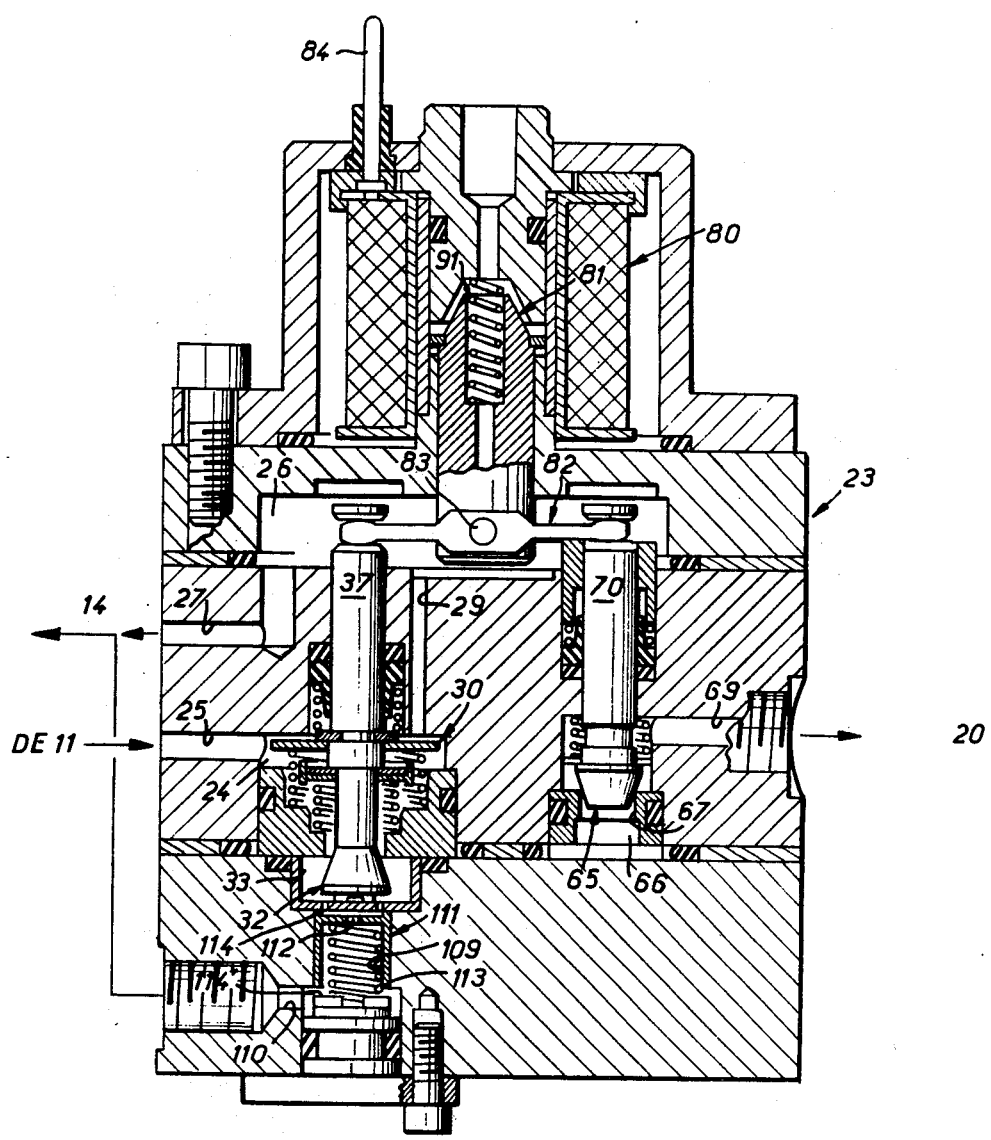
FIG. 9 is a view similar to FIG. 2 showing a third embodiment of the invention.

In the embodiment illustrated in FIG. 9, these second and third communication passages are independent of and separate from each other.

In the FIG. 9 embodiment, the bore 35 in which piston 55 is movably mounted is assimilated to only the third communication passage which is controlled by the valve 65 (not visible in FIG. 9). At the same time, the same communication between the first and second chambers 24 and 26 which is controlled by the valve 32, comprises, starting from the volume 33, a bore 109 and a passage 110 which, like the passage 27, is arranged to be connected to the wheel cylinder 14; the connection of 27 to the cylinder 14 may or may not be by way of the chamber 26.

A piston 111 is mounted movably in the bore 109, between two abutments 114 and 114', against the action of a spring 113; this arrangement is similar to those described above in respect of the piston 55, and like the piston 55 the end of the piston 111 has a calibrated orifice 112.

The other components of this construction are similar to those of the embodiments described above and operation thereof is therefore similar. It will be emphasised however that the fact that the second and third communications are independent of each other affords various advantages.

Firstly, by suitable selection of the characteristics of orifices 56 and 112 and the corresponding pistons 55 and 111, it is possible to act on the phases in which there is the rapid fall in pressure and/or the rapid rise in pressure, independently of each other; indeed, it is even possible to omit for example the phase in which there is a rapid rise in pressure, by omitting the piston 111, while maintaining a stationary calibrated orifice 112 in the corresponding bore 109.

In addition, there is no longer any communication between the volumes 33 and 66 which are associated respectively with valves 32 and 65, so that there is no longer the fear that the passage, in the open position of one of its valves, can cause an untimely movement of the other valve into its open position, at the cost of undue consumption of fluid.

Figure 7:
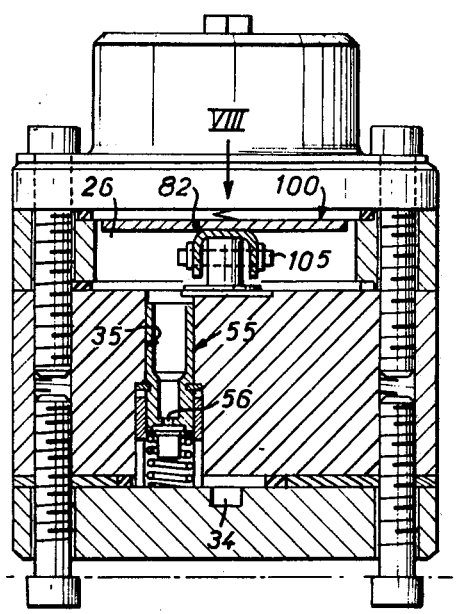
Figure 10:
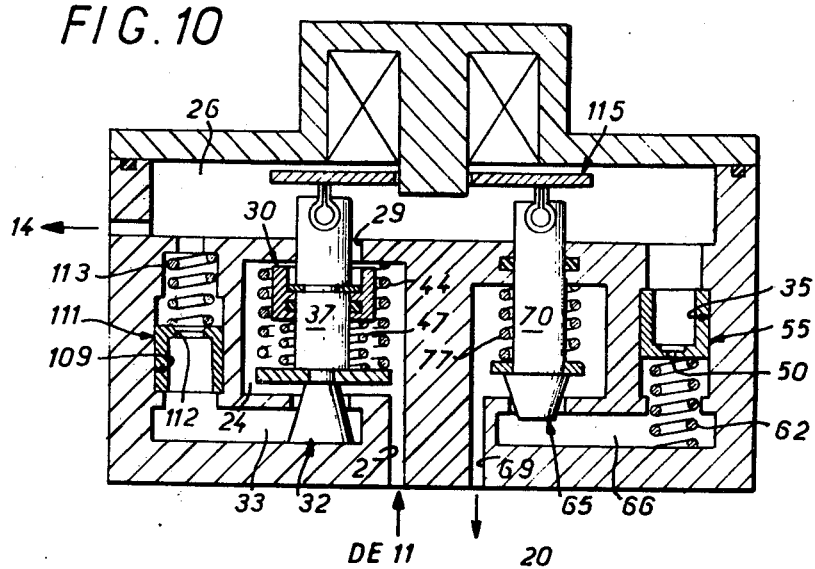
FIG. 10 is a view similar to FIG. 2 showing a fourth embodiment of the invention.
Figure 11:
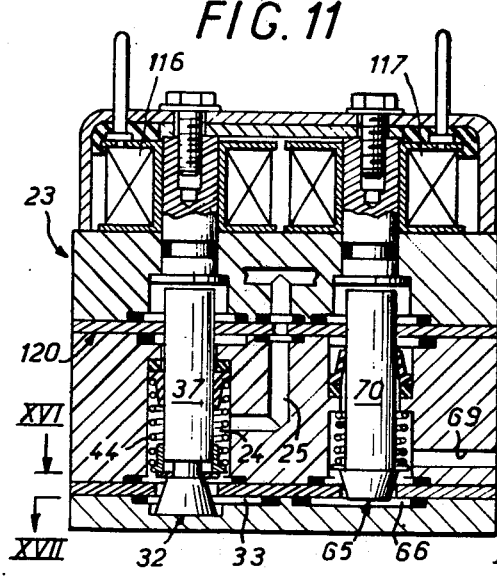
FIG. 11 is a view of a fifth embodiment of the modulating device of the invention, in axial cross-section along line XI—XI in FIG. 14.

The arrangement described above with reference to FIG. 9 is obviously applicable to a case in which, as shown diagrammatically in FIG. 10, the movable element controlled by the coil 80 is a blade or vane 115, similarly as in the embodiment illustrated in FIGS. 6 through 8. It will be noted that, in the embodiment illustrated in FIG. 10, the blade 115 itself forms the rocking lever to which the guide stems 37 and 70 are pivotally connected, and that the return spring 44 associated with the valve 32 urges the valve 32 towards the open position.

In the foregoing description, the electromagnetic actuating means for providing pilot control of the valves 32 and 65 are common to those two valves. However, in the embodiment illustrated in FIGS. 11 through 17, each valve 32 and 65 has associated therewith individual electromagnetic actuation means. Thus, there is a first energisation coil 116 for actuation of the valve 32, and a second energisation coil 117 for actuation of the valve 65. These coils 116 and 117 are mounted in series. Also, the guide stems 37 and 70 of the valves 32 and 65 are of magnetic material.

When the coils 116 and 117 are supplied with power, the flux which they produce is closed by a plate 120 of magnetic material which is disposed transversely in the hollow body 23, and they simultaneously attract the corresponding guide stems 37 and 70.

As illustrated, the guide stems extend beyond the chamber 26 connected by passage 27 to the wheel cylinder 14, and pass through apertures provided for this purpose in the plate 120.

It will be evident however that the guide stems could simply project into the chamber 26, as described above.

Furthermore, as illustrated, the isolating valve 30 is mechanically independent of the valve 32, whereas in the embodiment illustrated in FIGS. 1 through 10, the isolating valve 30 was connected in a disengageable manner for movement selectively with the valve 32. In the embodiments illustrated in FIGS. 11 through 17, the isolating valve 30 is directly piloted by the electromagnetic actuating means which provide the pilot action in respect of the valves 32 and 35.

Figure 12:
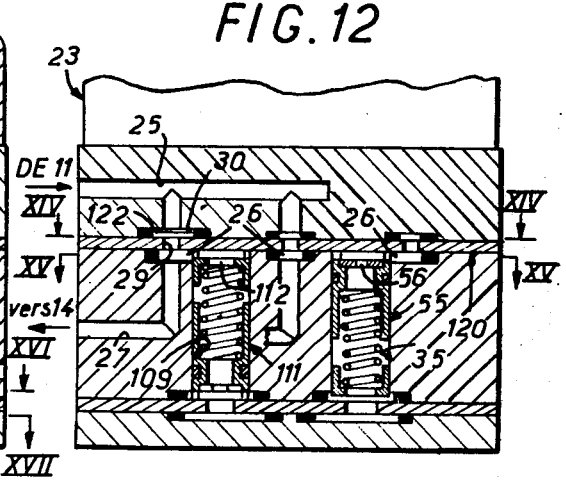
FIG. 12 is a view of part of the FIG. 11 embodiment, in axial cross-section along line XII—XII in FIG. 15.
Figure 13:
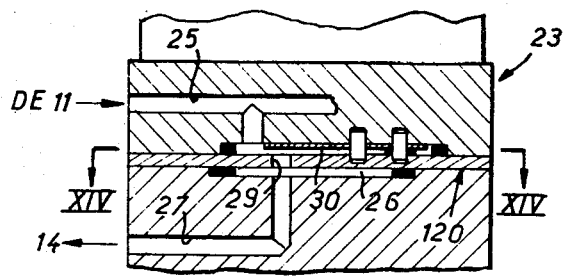
FIG. 13 is a view of part of the fifth embodiment in cross-section taken along line XIII—XIII in FIG. 14.
Figure 14:
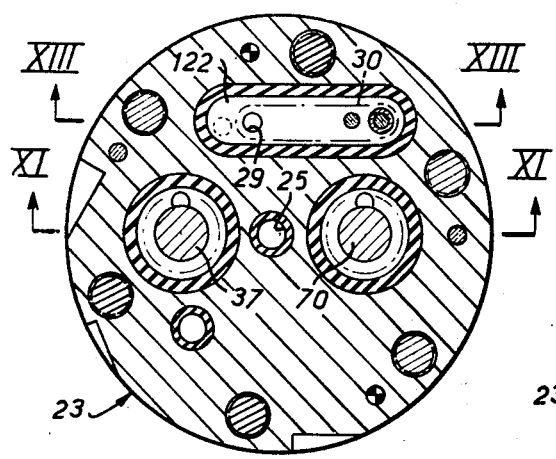
FIGS. 14 and 15 are views in cross-section taken respectively along lines XIV—XIV and XV—XV in FIG. 12.
Figure 15:
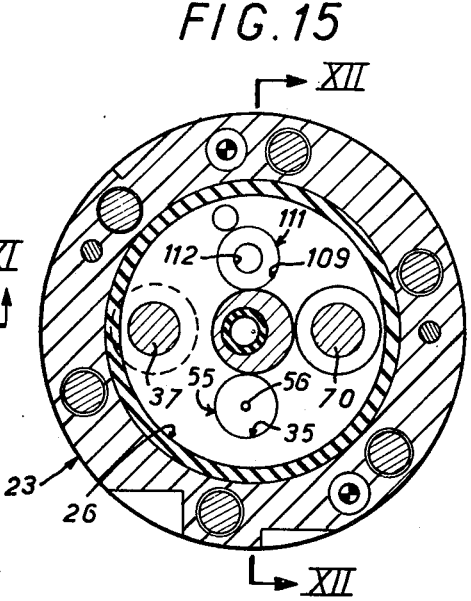
Figure 16:
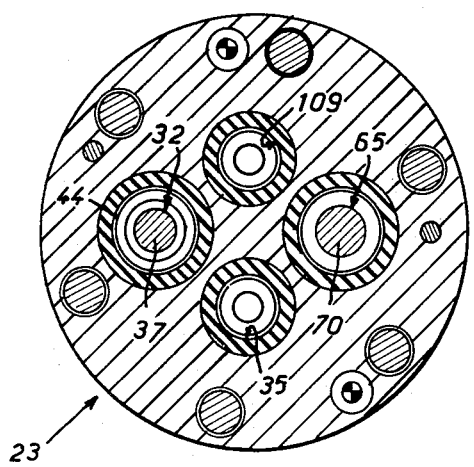
FIGS. 16 and 17 are views in cross-section taken respectively along lines XVI—XVI and XVII—XVII in FIG. 11.
Figure 17:
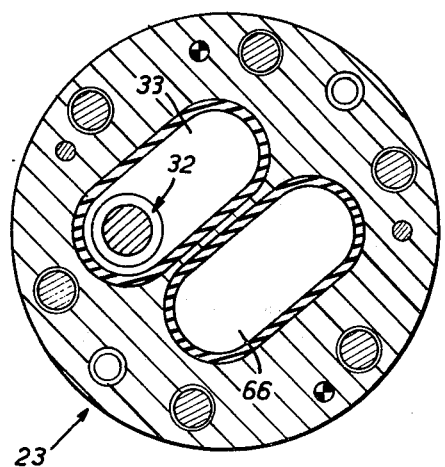

The passage 29 controlled by the valve 30 is formed in the plate 120 which is part of the circuit closing the energisation coils 116 and 117 for piloting the valve 32 and 55, and the valve 30 is itself a simple metal plate as shown in FIGS. 12 and 13.

When the coils 116 and 117 are fed with power, the metal plate forming the valve 30 is attracted by the plate 120 and therefore moves to close the associated passage 29. The metal plate forming the valve 120 is resiliently deformable and is fixed at its end remote from the passage 29. In its configuration in a rest condition, its free end is at a spacing from the passage 29.

The other components of the embodiment of FIGS. 11 through 17 are identical to those of the embodiments described above with reference to FIGS. 9 and 10, and the overall operation of this embodiment is similar thereto.

Figure 18:
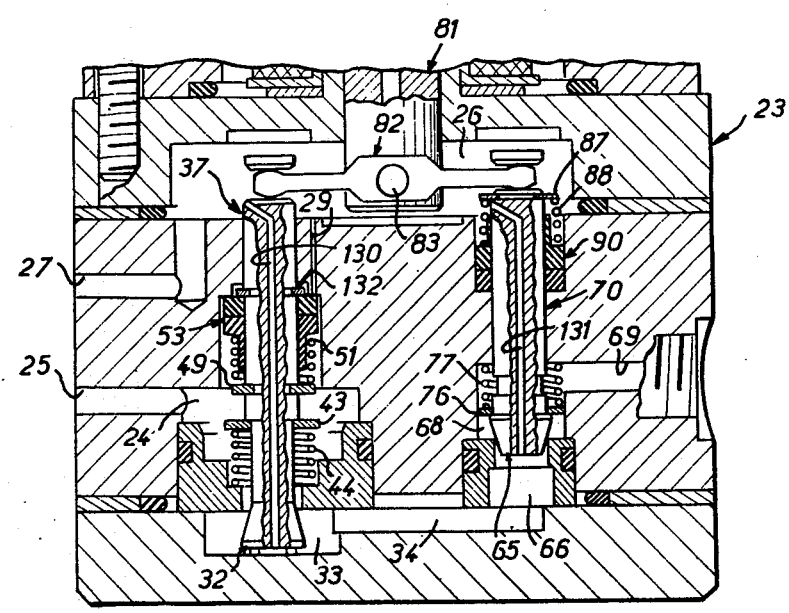
FIG. 18 is a view similar to that of FIG. 2 showing a sixth embodiment.

In the embodiment illustrated in FIG. 18, the above-described calibrated orifice 64 (or 112) which, associated with the valve 32 and forming part of the second communication controlled by that valve, was hitherto formed in a washer 63 associated with the end of the piston 55 (or disposed in the piston 113), to come into operation in the phase in which there was a controlled pressure rise. In the present embodiment however, the calibrated orifice is formed by a passage 130 which extends longitudinally through the valve 32 and the guide stem 37 carrying same, for example axially, as shown.

At the same time the washer 63 is omitted (or the end of the piston 111 is closed: not shown).

Likewise the calibrated orifice 56 which, associated with the valve 65 and forming part of the third communication controlled thereby, was hitherto formed in the end of the piston 55 in order to come into operation in the phase in which there was a controlled fall in pressure, is formed by a passage 131 which extends longitudinally through the valve 65 and the guide stem 70, for example axially as shown. The end of the piston 55 is also closed (not shown).

Obviously, the calibrated orifices referred to above can be in the form of restrictions in the respective passages.

Furthermore, in the embodiment of FIG. 18, the isolating valve is formed by the seal 53 associated with the guide stem 37 of the valve 32. By virtue of the associated spring 51, the seal 53 is urged towards a resilient split ring 132 carried by the guide stem 37, opposite the passage 29 to be controlled by the isolating valve.

It will be appreciated that in all embodiments, purge passages are suitably provided in the body 23, although such passages are not shown in the drawings for the purposes of simplification thereof.

It will be appreciated moreover that the present invention is not limited to the embodiments described and illustrated, but includes other embodiments of the principles of the invention and/or combinations of various elements of same.

In particular, although in the foregoing description the guide stems 37 and 70 extend axially in the same direction from their respective valve 32 and 65, this is not necessarily to be the case, as the guide stems can extend axially in opposite directions from their respective valves, in particular in the case where actuation of these valves is effected by individual electromagnetic actuating means.

What is claimed is:

1. A modulation device for a hydraulic circuit comprising a body providing a first chamber adapted to be connected to a hydraulic fluid actuator of the circuit, a second chamber adapted to be connected to a hydraulic fluid receiver of the circuit, first passage means between said first and second chambers and providing a first communication path and a second communication path therebetween, and second passage means providing a third communication path between said second chamber and a discharge path, an isolating valve for controlling the first communication path and which is normally open, a rising pressure regulating valve for controlling the second communication path and comprising a valve member and a guide rod member carrying the valve member and slidable in a first guide bore in the body for movement of the rising pressure regulating valve between open and closed positions, a falling pressure regulating valve for controlling said third communication path and comprising a valve member and a guide rod member carrying the valve member and slidable in a second guide bore in the body for movement of the falling pressure regulating valve between open and closed positions, said second guide bore being parallel to and laterally spaced from said first guide bore, and electromagnetic actuating means for providing pilot control of said regulating valves.

2. A device according to claim 1 wherein each said guide rod member carries its respective valve member at a first end, the second end of each said guide rod member being exposed to fluid pressure in said second chamber.

3. A device according to claim 2 wherein said second end of each said guide rod member is constantly engaged at least partly in a volume connected to said second chamber by said communication path controlled by the respective regulating valve.

4. A device according to claim 1 wherein said electromagnetic actuating means for pilot control of said regulating valves is common to both said regulating valves, and wherein a rocking means is disposed between the guide rod members of said regulating valves and operatively extends from one said guide rod member to the other.

5. A device according to claim 4 wherein said rocking means comprise a rocking lever pivotally engaged with each of the guide rod members.

6. A device according to claim 5 wherein the movable member of said electromagnetic actuating means is a movable armature to which said rocking lever is pivotally connected.

7. A device according to claim 5 wherein the movable member of said electromagnetic actuating means is a blade to which said rocking lever is connected.

8. A device according to claim 5 wherein the movable member of said electromagnetic actuating means is a blade which also forms said rocking lever.

9. A device according to claim 8 wherein said blade is of a generally cruciform shape.

10. A device according to claim 4 wherein the axes of said guide bores extend symmetrically on respective sides of the axis of energisation coil means of said common electromagnetic actuating means.

11. A device according to claim 1 wherein electromagnetic actuating means for pilot control of said regulating valves comprise a respective electromagnetic actuator associated with each said regulating valve.

12. A device according to claim 11 wherein said electromagnetic actuators are disposed in series and their closing circuits have in common a plate of magnetic material which is disposed transversely in said body.

13. A device according to claim 1 wherein the flow cross-section of the valve seat associated with the rising pressure regulating valve is substantially equal to the cross-section of said first guide bore of said rising pressure regulating valve.

14. A device according to claim 1 wherein said second and third communication paths include a common portion.

15. A device according to claim 14 wherein the passage means controlled by the respective regulating valves open into a common chamber opposite the respective guide rod members carrying the respective valve member.

16. A device according to claim 1 wherein said second and third communication paths are separate from each other, and said second and third communication paths being in communication only downstream of said rising pressure regulating valve.

17. A device according to claim 1 wherein at least one of said second and third communication paths includes a calibrated orifice.

18. A device according to claim 17 wherein each of said second and third communication paths comprises a respective said calibrated orifice.

19. A device according to claim 17 wherein in respect of at least one of said second and third communication paths said calibrated orifice is formed by a passage which passes longitudinally through the corresponding regulating valve member and the associated guide rod member.

20. A device according to claim 17 including a member associated with said calibrated orifice, said member having a calibrated orifice of smaller flow cross-section than the calibrated orifice of said communication path, said calibrated orifice of said member being arranged to operatively replace said calibrated orifice of said communication path in one direction of fluid flow.

21. A device according to claim 1 wherein a piston mounted for limited axial movement between two abutments is associated with at least one of said second and third communication paths, and including resilient means to urge said piston towards one of said abutments.

22. A device according to claim 1 wherein at least one of said second and third communication paths comprises a calibrated orifice and wherein a piston mounted for limited axial movement between two abutments is associated with at least one of said second and third communication paths, a resilient return means being provided to urge said piston towards one of said abutments, and wherein said calibrated orifice is carried by the corresponding piston in respect of said at least one of said second and third communication paths.

23. A device according to claim 1 wherein said isolating valve is disengagably connected to one of said regulating valves and comprises an annular disc member disposed annularly around the guide rod member of the respective said regulating valve, wherein a radially extending abutment is axially fixed on said guide rod member, and wherein a resilient means is provided for urging said annular disc member towards said abutment.

24. A device according to claim 23 wherein said annular disc member forming said isolating valve comprises a seal disposed around the guide rod member of the respective regulating valve.

25. A device according to claim 1 wherein said isolating valve is mechanically independent of said regulating valves.

26. A device according to claim 25 wherein said isolating valve is directly piloted by said electromagnetic actuating means.

27. A device according to claim 26 wherein the passage means controlled by said isolating valve is formed in a member of magnetic material which forms part of the magnetic closure circuit of said electromagnetic actuating means and wherein said isolating valve is a metal blade.

28. A device according to claim 1, wherein one of said valves guide members is displaceable in a first direction for moving its valve member into sealing relationship with its associated valve seat and the other of said valve guide members is displaceable in a direction parallel to but opposite from said first direction for moving its valve member into sealing relationship with its associated valve seat, the ends of said guide rod members being remote from their valve members.

29. A device according to claim 28, one of said regulating valve members being disposed axially at the same side of its associated valve seat as its guide rod member, and the other of said regulating valve members being disposed axially at the side of its associated valve seat opposite its guide rod member.

30. A device according to claim 29, wherein each of said regulating valve members is of generally frustoconical configuration, one of said valve members being connected to its associated valve rod at its smaller end and the other at its larger end.

31. A device according to claim 1, wherein said electromagnetic means includes a common armature means for said regulating valves.

32. A hydraulic circuit comprising a hydraulic fluid actuator, a hydraulic fluid receiver, a modulation device comprising a housing providing a first chamber connected to said actuator, a second chamber connected to said receiver, first passage means between said first and second chambers and providing a first communication path and a second communication path therebetween, and second passage means providing a third communication path between said second chamber and a discharge path, an isolating valve for controlling the first communication path and which is normally open, a rising pressure regulating valve for controlling the second communication path comprising a valve member and a guide rod member carrying the valve member and slidable in a first guide bore in the body for movement of the rising pressure regulating valve between open and closed positions, a falling pressure regulating valve for controlling said third communication path comprising a valve member and a guide rod member carrying the valve member and slidable in a second guide bore in the body for movement of the falling pressure regulating valve between open and closed positions, said second bore being parallel to and laterally spaced from said first bore, and electromagnetic actuating means for providing pilot control of said regulating valves, and line means connecting said actuator to said first chamber and said receiver to said second chamber.

33. A circuit according to claim 32 wherein said circuit is a motor vehicle brake actuating circuit, said actuator is a brake master cylinder and said receiver is a wheel brake cylinder.

* * * * *